Oct. 14, 1958  E. BLANCO  2,856,493
VARIABLE PONTENTIOMETER
Filed Aug. 30, 1955  3 Sheets-Sheet 1

ELIAS BLANCO
INVENTOR.

BY Fulwider Mattingly & Huntly

ATTORNEYS

Oct. 14, 1958   E. BLANCO   2,856,493
VARIABLE POTENTIOMETER
Filed Aug. 30, 1955   3 Sheets-Sheet 2

ELIAS BLANCO
INVENTOR.

BY *Zulwider, Mattingly & Huntly*
ATTORNEYS

ELIAS BLANCO
INVENTOR.

BY *Zulwider, Mattingly & Huntley*

ATTORNEYS

United States Patent Office 2,856,493
Patented Oct. 14, 1958

2,856,493

VARIABLE POTENTIOMETER

Elias Blanco, Hollywood, Calif., assignor, by mesne assignments, to Daystrom, Incorporated, Murray Hill, N. J., a corporation of New Jersey Application August 30, 1955, Serial No. 531,464

7 Claims. (Cl. 201—56)

This invention relates to potentiometer constructions and particularly to a sub-miniature potentiometer of the variable type.

In electrical equipment, potentiometers of various sizes are used. This invention is directed to a very small cylindrical type potentiometer approximately one inch long and one-half inch in diameter, weighing about 9 grams. These potentiometer units must be particularly accurate and reliable to provide the required results, the present construction providing full-scale electrical and mechanical performance in a minimum sized envelope.

With potentiometers of large size compared with the present invention, little difficulty was experienced in obtaining accurate voltage dividing. However, in computer and microwave equipment, especially air-borne radar equipment, where motion is required between a slider and resistor element and which is subject to vibration and shock, a reliable contact at all times between the sliding element and the fixed element is essential. The present invention is directed to a structure for providing these results, particularly in a miniature sized potentiometer having a guided rotary element which has a special spring biased slidable contact member. Although the structure is particularly suitable for subminiature potentiometers, its features have advantages in larger sized units.

The principal object of the invention, therefore, is to facilitate the accurate and reliable division of electrical voltages and currents.

Another object of the invention is to provide an improved potentiometer structure for obtaining an accurate division of electrical voltages and currents, particularly where motion is required between a sliding element and a fixed element.

A further object of the invention is to provide an improved sub-miniature potentiometer construction having accuracy and reliability of contact under all conditions.

The novel features which are believed to be characteristic of this invention, both as to the manner of its organization and the mode of its operation, will be better understood from the following description when read in conjunction with the accompanying drawings, in which.

Figure 8:
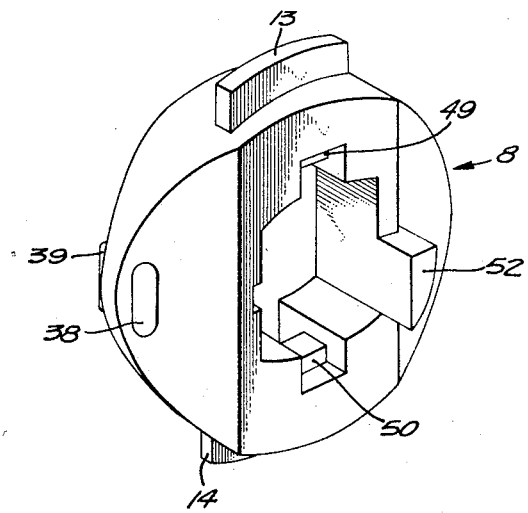
Fig. 8 is a perspective view of the guided rotatable carrier for the contact element of the invention.
Figure 9:
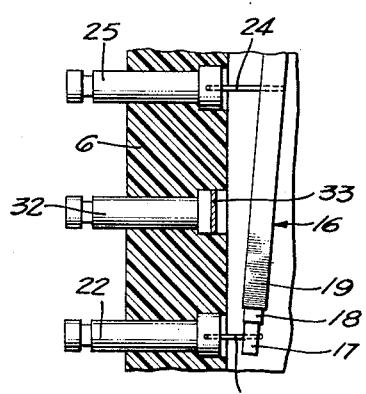
Fig. 9 is an enlarged detail view taken along the line 9—9 of Fig. 2.
Figure 11:
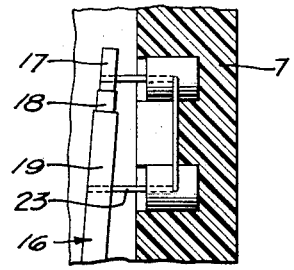
Fig. 11 is a cross-sectional view taken along the line 11—11 of Fig. 3.
Figure 10:
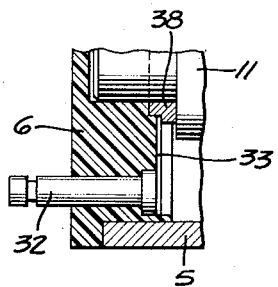
Fig. 10 is an enlarged detail view of one of the terminal elements.
Figure 13:
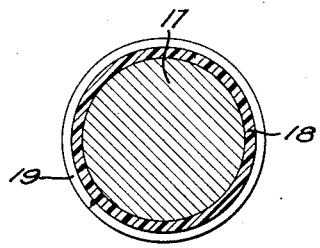
Fig. 13 is a cross-sectional view taken along the line 13—13 of Fig. 12.

Referring now to the drawings in which the same numerals identify like elements, a hollow cylindrical casing 5 has closing end members or bells 6 and 7, the end bells forming bearings for a shaft 11 of a guided rotatable slider carriage unit 8 shown in perspective in Fig. 8. The unit 8 is made of dielectric material, such as a ceramic, and is mounted on an insulating flat-sided cylinder 10 extending along the shaft 11. The carriage 8 has projections 13 and 14 which are accommodated in a spiral groove 15 cut in the inner surface of the cylindrical casing 5. Thus, as the shaft 11 is rotated, unit 8 is moved axially of shaft 11 in a direction depending upon the direction of rotation.

Figure 1:
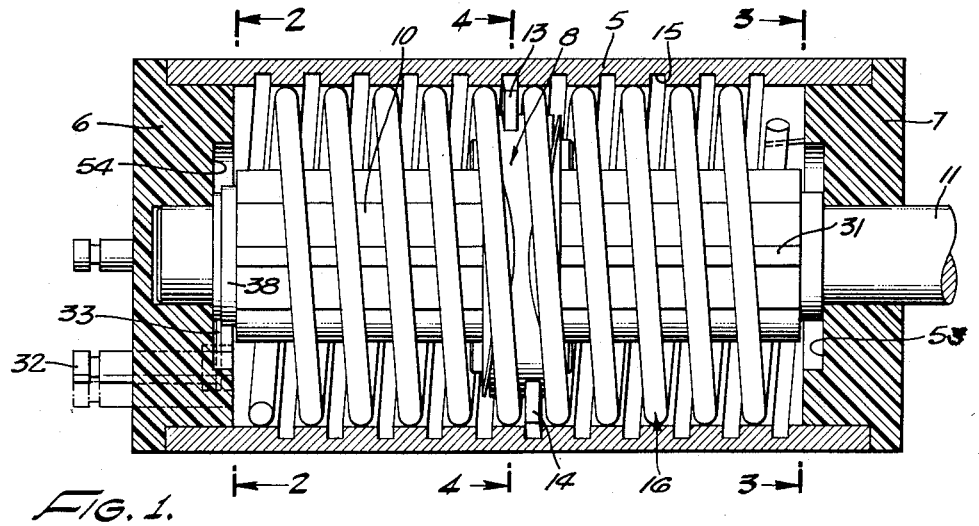
Fig. 1 is a cross-sectional view of a potentiometer embodying the invention.
Figure 2:
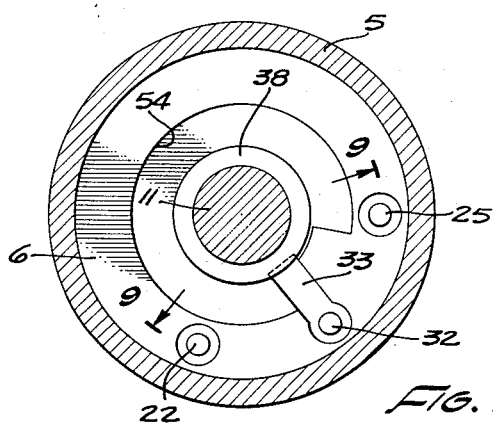
Fig. 2 is a cross-sectional view taken along the line 2—2 of Fig. 1.
Figure 3:
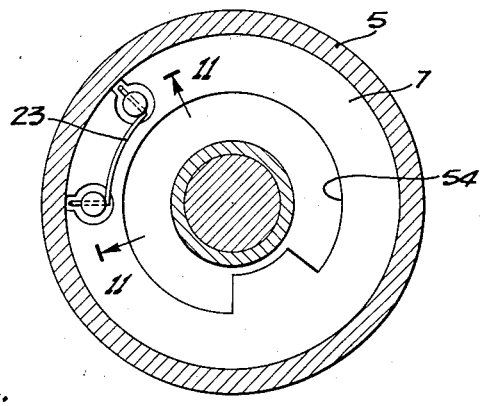
Fig. 3 is a cross-sectional view taken along the line 3—3 of Fig. 1.
Figure 4:
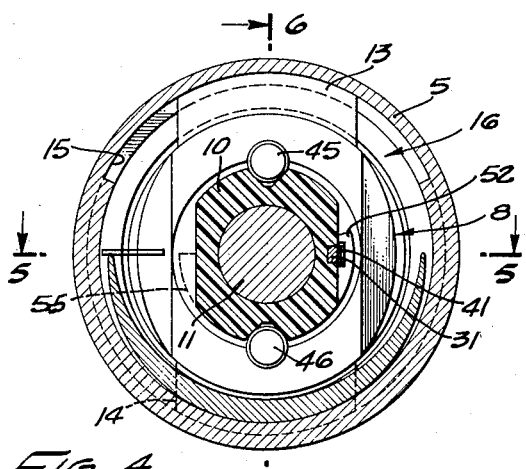
Fig. 4 is a cross-sectional view taken along the line 4—4 of Fig. 1.
Figure 5:
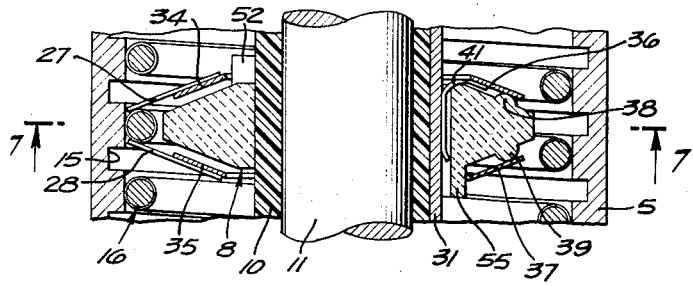
Fig. 5 is a detailed cross-sectional view taken along the line 5—5 of Fig. 4 showing the slider construction.
Figure 7:
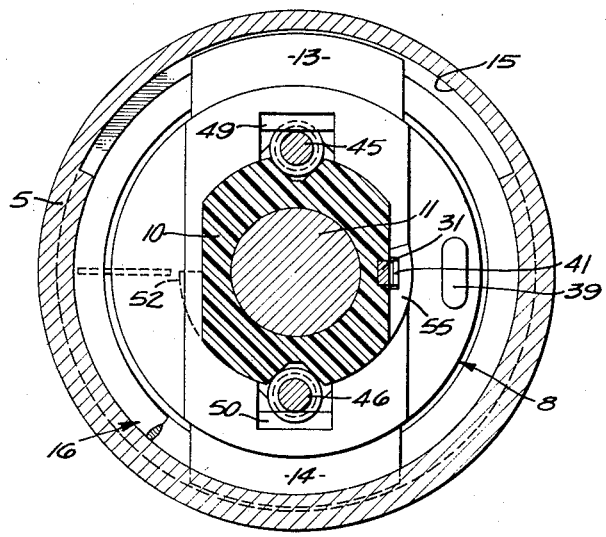
Fig. 7 is a cross-sectional view taken along the line 7—7 of Fig. 5.
Figure 12:
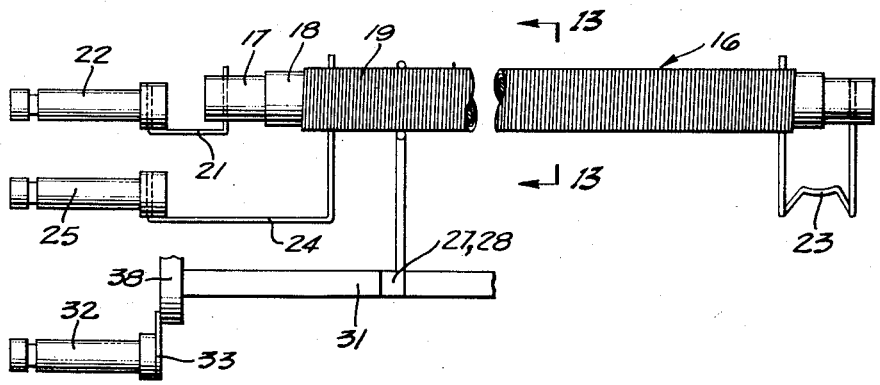
Fig. 12 is a diagrammatic view showing the contact elements of the potentiometer embodied in the invention.

The resistor element of the potentiometer is a spiral coil 16, a terminal portion being shown in Fig. 12, the coil being formed with a conducting core 17, an insulating covering 18, and a resistor wire 19, which has its adjacent turns spaced from each other. This coil is wound in a spiral, as shown in Fig. 1, and has connections made thereto as shown in Fig. 12. The core 17 is connected by a jumper 21 to a terminal post 22 passing through the end bell 6. The core is connected to the right hand end of the resistor wire 19 by a jumper 23 while the left hand end of the wire 19 is connected by a jumper 24 to a terminal 25 passing through end bell 6. The slider is connected through sliding contact elements 27 and 28 (see Fig. 5) to a conducting bar 31 which in turn is connected to a terminal post 32 passing through the end bell 6.

To provide a good reliable contact between the contact elements 27 and 28 and the wire 19 as the shaft 11 is rotated, the contact elements 27 and 28 are mounted on washer type springs 34 and 35, respectively, these springs being bent over at their opposite edge portions. The opposite edges of the spring washers 34 and 35, as shown at 36 and 37, bear against protuberances 38 and 39 on the element 8. This tensions the contact members 27 and 28 against the resistor wire 19.

This construction of the washers also provides a rigidity to the washers at right angles to the direction in which they are applying tension so that a positive constant pressure between contact elements 27 and 28 and the wire 19 is maintained to eliminate backlash. The conducting springs 34 and 35 are connected to a spring slider 41 biased against the conducting bar 31 on cylinder 10. A brush 33 attached to terminal 32 is in sliding contact with slipring 38 connected to the bar 31. By using two diametrically positioned contact elements or sliders, better resolution is obtained, since contacts are made with the wire a half turn apart. A single slider could only resolve to one full turn.

Figure 6:
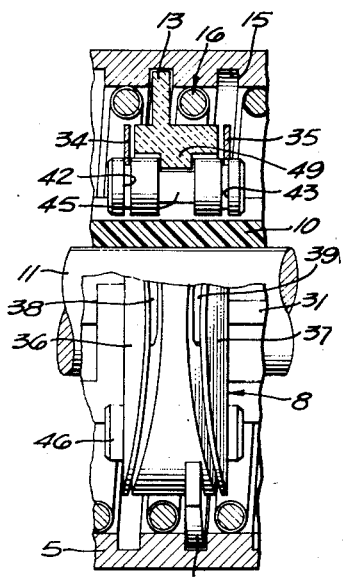
Fig. 6 is a detailed cross-sectional view of the slider construction taken along the line 6—6 of Fig. 4.

As shown in Fig. 6, the spring washers 34 and 35 are mounted in grooves 42 and 43 of two cylindrical spools 45 and 46 mounted in notches in an insulator 10. These spools are of metal and thus electrically connect the spring washers together. The spools 45 and 46 have a narrow center diameter in which are the projections 49 and 50 of the unit 8 so that as the unit 8 is rotated, the spools 45 and 46 will be moved axially to vary the position of the sliding contact members 27 and 28 on the resistor coil element 16. The tension in the spring washers 34 and 35 eliminates backlash between the spools and projections 49 and 50. The unit 8 has projections at each side thereof, such as shown at 52 and 55, these projections being adapted to provide stops for the rotatable unit when the projections enter the recesses 53 and 54 in the end bells 6 and 7, respectively, as shown in Fig. 1.

The above structure, therefore, functions to vary the amount of resistance between the terminals 25 and 32 and the terminals 22 and 32 by the rotation of the shaft 11 which carries the carriage 8 and the contact elements 27 and 28 along the cylinder 10. The unit 8 is guided accurately by the spiral groove 15, while the electrical circuit extends from the contact elements 27—28 through spring washers 34—35 contact element 41 and the bar 31. There is thus obtained a miniature type variable potentiometer which will accurately divide voltages with reliability under vibrating conditions.

I claim:

1. A potentiometer comprising a cylindrical casing having a spiral groove on the inner surface thereof, an end bell at each end of said casing for closing said casing, a spiral resistor element within said casing, and positioned between the turns of said groove, said resistor element having a core and a wire spirally wound on said core and spaced from the axis of said core, a rotatable shaft mounted in said end bells coaxially of said casing, a slidable contact assembly adapted to be rotated by said shaft, said assembly having projections extending into said spiral groove of said casing for moving said assembly axially of said casing when said assembly is rotated by said shaft, and including an insulator surrounding said shaft and having parallel sides, a carrier mounted on said insulator, and a pair of spools mounted on said carrier, a pair of spring washers supported by said spools and having elements thereon contacting said wire of said spiral resistor elements one-half turn apart, a conducting bar on said assembly connected to said washers, and connectors extending from the ends of said resistor element and from said bar to the exterior of said casing.

2. A potentiometer comprising a cylindrical casing having a spiral groove on the inner surface thereof, an end bell at each end of said casing for closing said casing, a spiral resistor element within said casing and positioned between the turns of said groove, said resistor element having a core and a wire spirally wound on said core and spaced from the axis of said core, a rotatable shaft mounted in said end bells coaxially of said casing, a slidable contact assembly adapted to be rotated by said shaft, said assembly having projections extending into said spiral groove of said casing for moving said assembly axially of said casing when said assembly is rotated on said shaft, and including an insulator surrounding said shaft and having parallel sides, a carrier mounted on said insulator, and a pair of spools mounted on said carrier, a pair of spring washers supported by said spools and having elements thereon contacting said wire of said spiral resistor elements one-half turn apart, said spring washers having diametrically opposed bent-over portions to provide more rigidity in one direction than in a direction at right angles thereto, a conducting bar on said assembly connected to said washers, and connectors extending from the ends of said resistor element and from said bar to the exterior of said casing.

3. A potentiometer comprising a cylindrical casing having a spiral groove on the inner surface thereof, an end bell at each end of said casing for closing said casing, a spiral resistor element within said casing and positioned between the turns of said groove, said resistor element having a core and a wire spirally wound on said core and spaced from the axis of said core, a rotatable shaft mounted in said end bells coaxially of said casing, a slidable contact assembly adapted to be rotated by said shaft, said assembly having projections extending into said spiral groove of said casing for moving said assembly axially of said casing when said assembly is rotated on said shaft, and including an insulator surrounding said shaft and having parallel sides, a carrier mounted on said insulator, and a pair of spools mounted on said carrier, a pair of spring washers supported by said spools and having elements thereon contacting said wire of said spiral resistor elements one-half turn apart, said spring washer having diametrically opposed bent-over portions to provide more rigidity in one direction than in a direction at right angles thereto, a conducting bar on said assembly, a spring brush on said assembly in contact with said bar and one of said spring washers, said spring washers being electrically connected through said spools, and connectors extending from the ends of said resistor element and from said bar to the exterior of said casing.

4. A potentiometer structure comprising a cylindrical casing having a spiral groove along the inner surface thereof, a rotatable shaft assembly including electrical contact brushes, a plate at each end of said casing for closing said casing, said shaft assembly having its ends rotatable in said plates, a spiral resistor element within said casing positioned between the turns of said groove, said resistor element including an electrical conducting core, insulation on said core, and a wire spirally wound on said insulation, said shaft assembly including a carriage for holding said electrical contact brushes in contact with said wire of said resistor element, said brushes contacting said wire one-half turn apart, said carriage having portions thereof in said groove to move said contact elements along said resistor element when said carriage is rotated by said shaft, said carriage including an insulating element mounted on said shaft, a pair of spools mounted on said insulating element, and spring washers mounted on said spools for tensioning said brushes in two directions, and connectors extending from the ends of said wire of said resistor element and from said contact brushes to the exterior of said casing.

5. A potentiometer structure comprising a cylindrical casing having a spiral groove along the inner surface thereof, a rotatable shaft assembly including electrical contact brushes, a plate at each end of said casing for closing said casing, said shaft assembly having its ends rotatable in said plates, a spiral resistor element within said casing positioned between the turns of said groove, said resistor element including an electrical conducting core, insulation on said core, and a wire spirally wound on said insulation, said shaft assembly including a carriage for holding said electrical contact brushes in contact with said wire of said resistor element, said brushes contacting said wire one-half turn apart, said carriage having portions thereof in said groove to move said contact elements along said resistor element when said carriage is rotated by said shaft, said carriage including an insulating element extending along said shaft and having a conducting bar thereon parallel with the axis of said shaft, spools arranged diametrically opposite said insulating element, spring washers mounted on said spools for tensioning said brushes in two directions, and connectors extending from the ends of said wire of said resistor element and from said contact brushes to the exterior of said casing.

6. A potentiometer structure comprising a cylindrical casing having a spiral groove therein around the inner surface of said cylinder, carriage means having portions thereof in said groove for moving said carriage means axially of said casing when said carriage means is rotated, end plates closing the ends of said casing, a shaft mounted for rotation in said end plates and supporting said carriage means, said carriage means including an insulating element mounted on said shaft and along the length of said shaft within said casing, a conducting bar on said insulating element, a pair of spools mounted diametrically opposite one another on said insulating element, a spiral resistor element along the inner surface of said casing between the turns of said spiral groove, said resistor element including a core with wire wound spirally thereon spaced from the axis of said casing, a pair of annular spring washers mounted on said spools and forming electrical contact elements for engaging opposite sides of said resistor element at points one-half turn apart when rotated with the carriage, and a brush between one of said washers and said conducting bar.

7. A potentiometer structure comprising a cylindrical casing having a spiral groove therein around the inner surface of said cylinder, carriage means having portions thereof in said groove for moving said carriage means axially of said casing when said carriage means is rotated, end plates closing the ends of said casing, a shaft mounted for rotation in said end plates and supporting said carriage means, said carriage means including an insulating element mounted on said shaft and along the length of said shaft within said casing, a conducting bar on said insulating element, a pair of spools mounted diametrically opposite one another on said insulating element, a spiral resistor element along the inner surface of said casing between the turns of said spiral groove, said resistor element including a core with wire wound spirally thereon spaced from the axis of said casing, a pair of annular spring washers mounted on said spools forming electrical contact elements for engaging opposite sides of said resistor element at points one-half turn apart when rotated with the carriage, a brush between one of said washers and said conducting bar, a conducting ring in contact with said bar mounted on the end of said insulating element, and a stationary brush having electrical contact with said conducting ring.

References Cited in the file of this patent

UNITED STATES PATENTS

| 1,921,441 | Templeton | Aug. 8, 1933 |
| 2,454,986 | Beckman | Nov. 30, 1948 |
| 2,473,048 | Beckman | June 14, 1949 |
| 2,595,189 | Dewan | Apr. 29, 1952 |
| 2,665,355 | Van Alen et al. | Jan. 5, 1954 |